United States Patent
Littlefield

(10) Patent No.: US 6,672,322 B1
(45) Date of Patent: Jan. 6, 2004

(54) SCREEN ASSEMBLY FOR STORING WILD GAME MEAT

(75) Inventor: Mark H. Littlefield, Eagle River, AK (US)

(73) Assignee: Mark Harold Littlefield, Eagle River, AK (US)

( * ) Notice: Subject to any disclaimer, the term of this patent is extended or adjusted under 35 U.S.C. 154(b) by 0 days.

(21) Appl. No.: 10/336,377

(22) Filed: Jan. 3, 2003

(51) Int. Cl.[7] .......................... E04H 15/04; E04H 15/54
(52) U.S. Cl. .................... 135/90; 452/187; 452/185; 135/115
(58) Field of Search .................. 452/187, 185, 452/188, 189, 190, 191, 192; 135/90, 115

(56) References Cited

U.S. PATENT DOCUMENTS

| 985,113 | A | * | 2/1911 | Conrad | 452/187 |
| 1,411,272 | A | * | 4/1922 | Eaton | 135/90 |
| 2,505,159 | A | * | 4/1950 | Teague | 452/187 |
| 2,631,520 | A | * | 3/1953 | Geerling | 135/90 |
| 2,750,224 | A | * | 6/1956 | Matheny | 452/191 |
| 3,530,834 | A | * | 9/1970 | Hollenback | 119/728 |
| 3,744,500 | A | * | 7/1973 | Briggs | 135/140 |
| 4,086,931 | A | * | 5/1978 | Hall | 135/98 |
| 4,685,483 | A | * | 8/1987 | Balazs | 135/152 |
| 4,856,666 | A | * | 8/1989 | Easley | 215/272 |
| 5,042,517 | A | * | 8/1991 | Stewart | 135/115 |
| 5,172,712 | A | * | 12/1992 | Robinson | 135/98 |

* cited by examiner

Primary Examiner—Charles T. Jordan
Assistant Examiner—Judith A. Nelson
(74) Attorney, Agent, or Firm—Edward P. Dutkiewicz

(57) ABSTRACT

A screen assembly for storing wild game meat comprising: a mesh cylinder fabricated of mesh material and having an open upper end; and a top section fabricated of waterproof material and affixed over the upper end of the mesh cylinder, a locking clip having a cable extending therefrom and through the upper section, the cable being fixed relative to the upper section, the clip adapted to be coupled around a tree limb in an operative orientation, the cable having a lower end including a hook for hanging wild game meat.

6 Claims, 3 Drawing Sheets

SCREEN ASSEMBLY FOR STORING WILD GAME MEAT

BACKGROUND OF THE INVENTION

1. Field of the Invention

The present invention relates to a screen assembly for storing wild game meat and more particularly pertains to hanging wild game meat within the mesh cylinder to permit airflow while protecting the meat from insects and other animals.

2. Description of the Prior Art

The use of screen devices is known in the prior art. More specifically, screen devices heretofore devised and utilized for the purpose of protecting users from insects and adverse weather are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,172,712 to Robinson a screen apparatus.

U.S. Pat. No. 3,744,500 to Briggs discloses a screen enclosure for picnic tables.

U.S. Pat. No. 4,856,666 to Easley discloses a food covering.

U.S. Pat. No. 4,685,483 to Balazs discloses a collapsible support for food screen.

Lastly, U.S. Pat. No. 4,086,931 to Hall discloses a umbrella shelter.

In this respect, the screen assembly for storing wild game meat according to the present invention substantially departs from the conventional concepts and designs of the prior art, and in doing so provides an apparatus primarily developed for the purpose of hanging wild game meat within the mesh cylinder to permit airflow while protecting the meat from insects and other animals.

Therefore, it can be appreciated that there exists a continuing need for a new and improved screen assembly for storing wild game meat which can be used for hanging wild game meat within the mesh cylinder to permit airflow while protecting the meat from insects and other animals. In this regard, the present invention substantially fulfills this need.

SUMMARY OF THE INVENTION

In view of the foregoing disadvantages inherent in the known types of screen devices now present in the prior art, the present invention provides an improved screen assembly for storing wild game meat. As such, the general purpose of the present invention, which will be described subsequently in greater detail, is to provide a new and improved screen assembly for storing wild game meat and method which has all the advantages of the prior art and none of the disadvantages.

To attain this, the present invention essentially comprises a new and improved screen assembly for storing wild game meat comprising, in combination: a mesh cylinder fabricated of rigid nylon mosquito netting and formed in a generally cylindrical configuration with an open upper end, an open lower end, a peripheral center point and an axial center point, the lower end including zipper teeth, the mesh cylinder having an inner surface and an outer surface, a plurality of fabric tabs including hook and loop coupling means being affixed to the upper end, lower end and peripheral center point of the inner surface of the cylinder; an upper ring, a lower ring and a center ring, each ring being fabricated of rigid material, the upper ring being coupled within the tabs of the upper end, the lower ring being coupled within the tabs of the lower end, the center ring being coupled within the tabs of the peripheral center point, the rings providing support to the apparatus, three radially positioned rods, each rod being coupled to the center ring by a spring and equidistantly spaced from the adjacent rods; a top section fabricated of rigid waterproof material and affixed over the upper end of the mesh cylinder, the top section being formed in a hollow generally conical configuration with an open circular lower extent and a pointed upper extent, a locking clip having a cable extending therefrom and through the pointed upper extent of the upper section, the cable being fixed relative to the upper section, the clip being formed of two pivotally coupled C-shaped members, each C-shaped member including a free end with coupling means, the clip adapted to be coupled around a tree limb in an operative orientation, the cable having a lower end including a hook for hanging wild game meat; and a bottom section fabricated of washable fabric material and formed in a generally cylindrical configuration with an open upper end including zipper teeth positioned therearound, a zipper device permitting releasable coupling of the bottom section to the lower end of the mesh cylinder.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved screen assembly for storing wild game meat which has all of the advantages of the prior art screen devices and none of the disadvantages.

It is another object of the present invention to provide a new and improved screen assembly for storing wild game meat which may be easily and efficiently manufactured and marketed.

It is further object of the present invention to provide a new and improved screen assembly for storing wild game meat which is of durable and reliable constructions.

An even further object of the present invention is to provide a new and improved screen assembly for storing wild game meat which is susceptible of a low cost of manufacture with regard to both materials and labor, and which accordingly is then susceptible of low prices of sale to the consuming public, thereby making such screen assembly for storing wild game meat economically available to the buying public.

Still yet another object of the present invention is to provide a new and improved screen assembly for storing wild game meat which provides in the apparatuses and methods of the prior art some of the advantages thereof, while simultaneously overcoming some of the disadvantages normally associated therewith.

Still another object of the present invention is hanging wild game meat within the mesh cylinder to permit airflow while protecting the meat from insects and other animals.

Lastly, it is an object of the present invention to provide a new and improved screen assembly for storing wild game meat comprising: a mesh cylinder fabricated of mesh material and having an open upper end; and a top section fabricated of waterproof material and affixed over the upper end of the mesh cylinder, a locking clip having a cable extending therefrom and through the upper section, the cable being fixed relative to the upper section, the clip adapted to be coupled around a tree limb in an operative orientation, the cable having a lower end including a hook for hanging wild game meat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
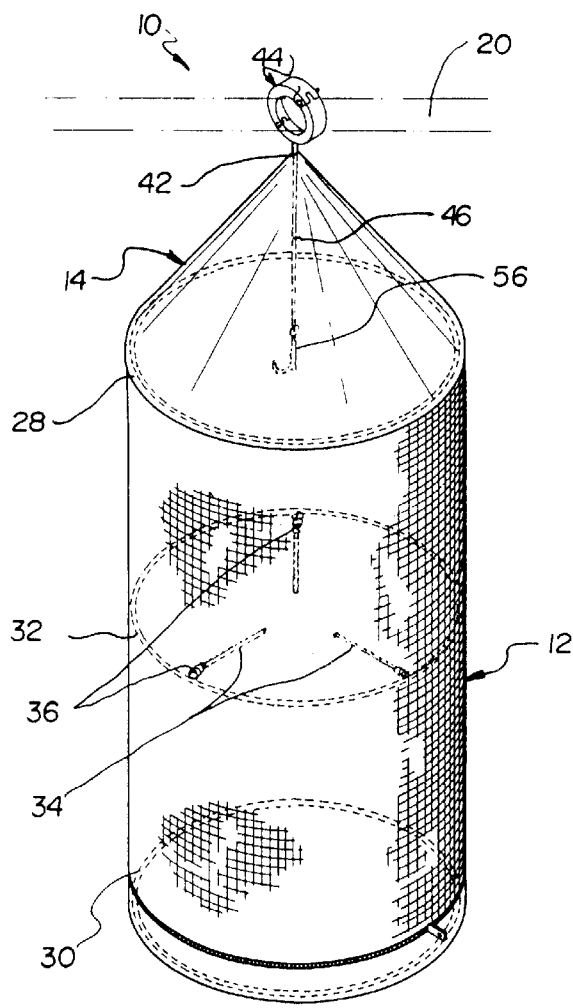
FIG. 1 is a perspective view of the preferred embodiment of the screen assembly for storing wild game meat constructed in accordance with the principles of the present invention.

With reference now to the drawings, and in particular to FIG. 1 thereof, the preferred embodiment of the new and improved screen assembly for storing wild game meat embodying the principles and concepts of the present invention and generally designated by the reference numeral 10 will be described.

The present invention, the screen assembly for storing wild game meat 10 is comprised of a plurality of components. Such components in their broadest context include a mesh cylinder 12, a top section 14 and a bottom section 16. Such components are individually configured and correlated with respect to each other so as to attain the desired objective.

Figure 3:
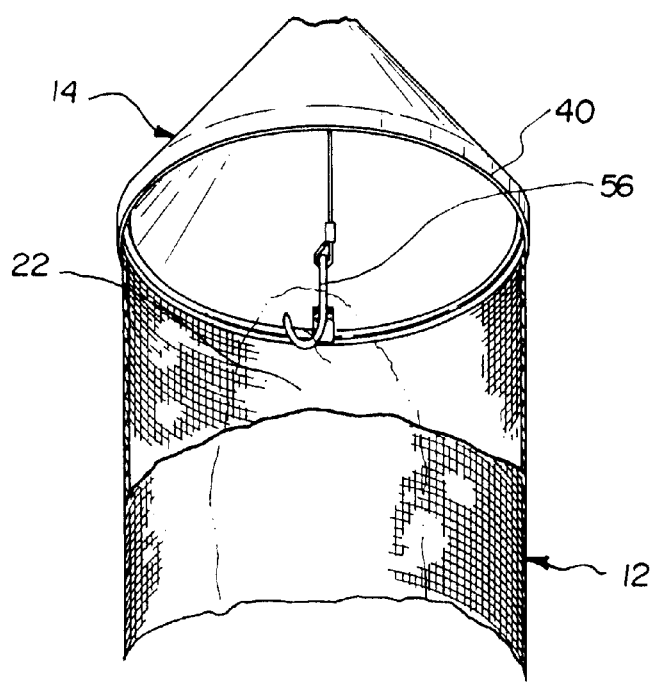
FIG. 3 is a broken away perspective view illustrating the positioning of game meat upon the meat hook of the apparatus.

The screen assembly for storing wild game meat 10 is adapted for use in association with a tree limb 20 to permit suspension of the apparatus above the ground. The apparatus is primarily designed for use while hunting wild game in wooded areas. After wild game 22 has been killed, it is stored within the mesh cylinder to permit airflow while protecting the meat from insects and other animals. Note FIG. 3.

More specifically, the mesh cylinder 12 is fabricated of rigid nylon mosquito netting and formed in a generally cylindrical configuration with an open upper end, an open lower end, a peripheral center point and an axial center point. In alternative embodiments the cylinder is fabricated of various types of mesh material. In the preferred embodiment the diameter of the mesh cylinder is about twenty four inches. In varying embodiments the apparatus is fabricated in a plurality of different heights and diameters to accommodate different types of wild game. Note FIGS. 1 and 3.

Figure 4:
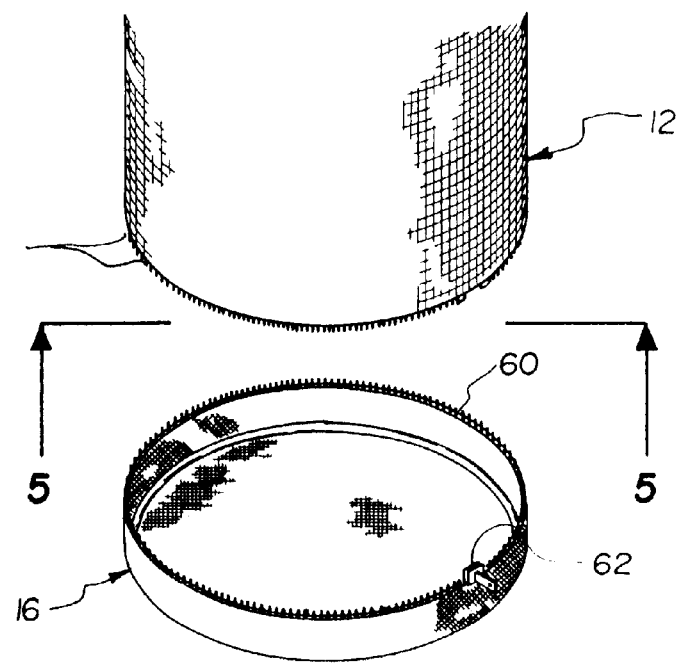
FIG. 4 is a separated perspective view illustrating the configuration of the bottom member of the apparatus.
Figure 5:
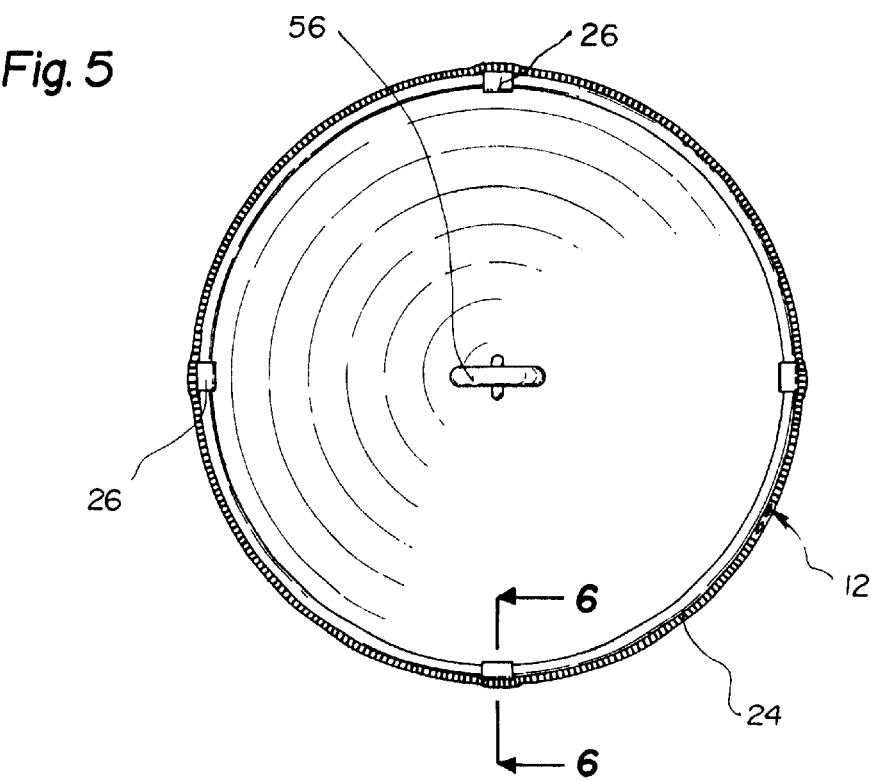
FIG. 5 is a bottom perspective view of the mesh cylinder taken along section line 5—5 of FIG. 4.
Figure 6:
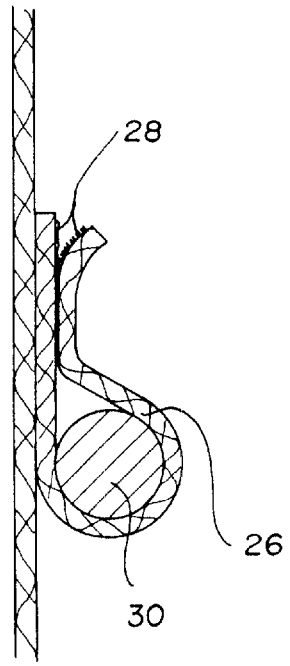
FIG. 6 is an enlarged cross sectional view taken along section line 6—6 of FIG. 5 illustrating a ring coupled within the mesh cylinder.

The lower end of the cylinder includes plastic zipper teeth 24. The mesh cylinder has an inner surface and an outer surface. A plurality of fabric tabs 26 including hook and loop coupling means 28 are affixed to the upper end, lower end and peripheral center point of the inner surface of the cylinder. The tabs are positioned at four equidistant locations around each ring. In the preferred embodiment the hook and loop coupling means are fabricated of VELCRO. Note FIGS. 4–6.

An upper ring 28, a lower ring 30 and a center ring 32 are included with the apparatus. Each ring is fabricated of stainless steel. In alternate embodiments the rings are fabricated of fiberglass. The upper ring 28 is coupled within the tabs 26 of the upper end. The lower ring 30 is coupled within the tabs of the lower end. The center ring 32 is coupled within the tabs of the peripheral center point. The rings provide strength and support to the apparatus. Note FIG. 1.

Three radially positioned rods 34 are each fabricated of stainless steel. Each rod is about six inches long in the preferred embodiment and coupled to the center ring by a spring 36. The rods are equidistantly spaced and serve to retain suspended wild game at about the axial center point of the mesh cylinder. The spring coupling of the rods permits accommodation of a wide range of differently sized wild game. The rods prevent wind from swinging the wild game back and forth within the mesh cylinder. Note FIG. 1.

The top section 14 is fabricated of rigid waterproof material, preferably plastic, and affixed over the upper end of the mesh cylinder. The top section is formed in a hollow generally conical configuration with an open circular lower extent 40 and a pointed upper extent 42. The waterproof conical construction of the top section serves to minimize the amount of water entering the apparatus when raining or snowing. Note FIGS. 1 and 3.

Figure 2:
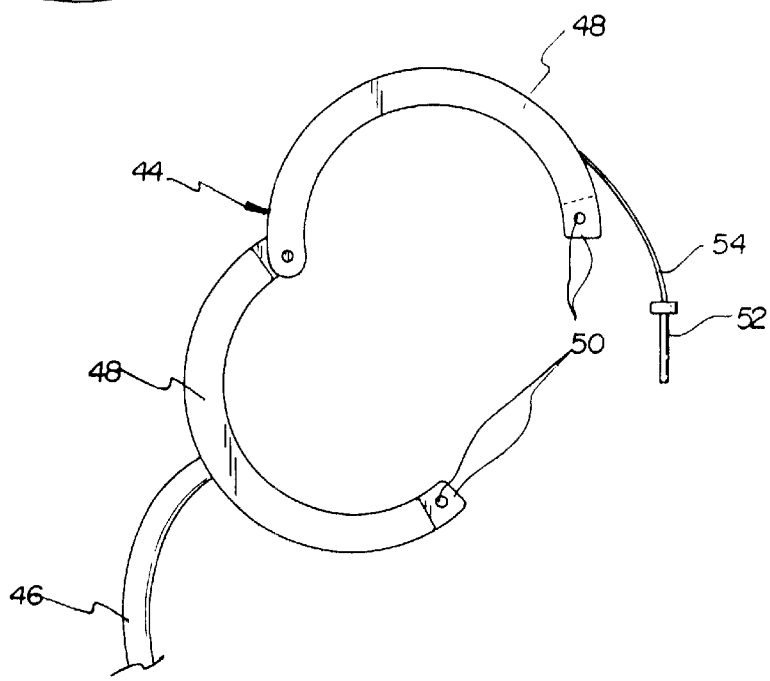
FIG. 2 is an isolated perspective view of the locking clip of the apparatus.

A locking clip 44 has a cable 46 extending from it and through the pointed upper extent of the upper section. The cable is fixed relative to the upper section such that the upper section is suspended from the cable during use. The clip is formed of two pivotally coupled C-shaped members 48. Each C-shaped member includes a free end with interlocking coupling members 50. The coupling members 50 each include an aperture extending through them. A locking pin 52 is coupled to the clip by a tether 54. To lock the clip around a tree branch the C-shaped members 48 are pivoted with respect to each other and secured around the branch by positioning the locking pin 52 through the aligned apertures of the coupling members 50. Note FIGS. 1 and 2.

The cable has a lower end which includes a hook 56 for hanging wild game meat after the game has been killed. The wild game is suspended from the hook within the interior of the mesh cylinder. This permits airflow through the apparatus while protecting the meat from insects and other animals. The waterproof top section facilitates drying of the wild game by minimizing the amount of rain, snow or dew falling on the game. Suspension from a tree limb minimizes the number of animals which could potentially knaw at the mesh cylinder to feed on the drying game meat. Note FIG. 1, 3 and 5.

The bottom section 16 is fabricated of washable fabric material such as a cotton and polyester blend. The bottom section is formed in a generally cylindrical configuration with an open upper end including zipper teeth 60. A zipper device 62 permits releasable coupling of the bottom section to the lower end of the mesh cylinder. The fabric construction of the bottom section serves to absorb blood and other substances dripping from suspended wild game. The zipper of the bottom section permits easy washing after use. Note FIG. 4.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved screen assembly for storing wild game meat comprising, in combination:

a mesh cylinder fabricated of rigid nylon mosquito netting and formed in a generally cylindrical configuration with an open upper end, an open lower end, a peripheral center point and an axial center point, the lower end including zipper teeth, the mesh cylinder having an inner surface and an outer surface, a plurality of fabric tabs including hook and loop coupling means being affixed to the upper end, lower end and peripheral center point of the inner surface of the cylinder;

an upper ring, a lower ring and a center ring, each ring being fabricated of rigid material, the upper ring being coupled within the tabs of the upper end, the lower ring being coupled within the tabs of the lower end, the center ring being coupled within the tabs of the peripheral center point, the rings providing support to the apparatus, three radially positioned rods, each rod being coupled to the center ring by a spring and equidistantly spaced from the adjacent rods;

a top section fabricated of rigid waterproof material and affixed over the upper end of the mesh cylinder, the top section being formed in a hollow generally conical configuration with an open circular lower extent and a pointed upper extent, a locking clip having a cable extending therefrom and through the pointed upper extent of the upper section, the cable being fixed relative to the upper section, the clip being formed of two pivotally coupled C-shaped members, each C-shaped member including a free end with coupling means, the clip adapted to be coupled around a tree limb in an operative orientation, the cable having a lower end including a hook for hanging wild game meat; and a bottom section fabricated of washable fabric material and formed in a generally cylindrical configuration with an open upper end including zipper teeth positioned therearound, a zipper device permitting releasable coupling of the bottom section to the lower end of the mesh cylinder.

2. A screen assembly for storing wild game meat comprising:

a mesh cylinder fabricated of mesh material and having an open upper end; and a top section fabricated of waterproof material and affixed over the upper end of the mesh cylinder, a locking clip having a cable extending therefrom and through the upper section, the cable being fixed relative to the upper section, the clip adapted to be coupled around a tree limb in an operative orientation, the cable having a lower end including a hook for hanging wild game meat.

3. The screen assembly for storing wild game meat as set forth in claim 2 wherein the mesh cylinder has an open lower end including zipper teeth, the apparatus further including:

a bottom section fabricated of washable fabric material and formed in a generally cylindrical configuration with an open upper end including zipper teeth positioned therearound, a zipper device permitting releasable coupling of the bottom section to the lower end of the mesh cylinder.

4. The screen assembly for storing wild game meat as set forth in claim 2 wherein the mesh cylinder has a lower end, a peripheral center point and an axial center point, the apparatus further including:

an upper ring, a lower ring and a center ring, each ring being fabricated of rigid material, the upper ring being coupled within the tabs of the upper end, the lower ring being coupled within the tabs of the lower end, the center ring being coupled to the peripheral center point, the rings providing support to the apparatus.

5. The screen assembly for storing wild game meat as set forth in claim 4 and further including:

three radially positioned rods, each rod being coupled to the center ring by a spring and equidistantly spaced from the adjacent rods.

6. The screen assembly for storing wild game meat as set forth in claim 2 wherein the clip is formed of two pivotally coupled C-shaped members, each C-shaped member including a free end with coupling means.

* * * * *